US012326040B2

(12) United States Patent
Riemelmoser

(10) Patent No.: US 12,326,040 B2
(45) Date of Patent: Jun. 10, 2025

(54) BLOCKOUT BLIND SYSTEM

(71) Applicant: COMMERCIALISATION EXPRESS PTY LTD, Salisbury Heights (AU)

(72) Inventor: John Riemelmoser, Salisbury Heights (AU)

(73) Assignee: Commercialisation Express Pty Ltd, Salisbury Heights (ZA)

( * ) Notice: Subject to any disclaimer, the term of this patent is extended or adjusted under 35 U.S.C. 154(b) by 306 days.

(21) Appl. No.: 17/641,176

(22) PCT Filed: Sep. 15, 2020

(86) PCT No.: PCT/AU2020/050980
§ 371 (c)(1),
(2) Date: Mar. 8, 2022

(87) PCT Pub. No.: WO2021/051160
PCT Pub. Date: Mar. 25, 2021

(65) Prior Publication Data

US 2022/0341257 A1 Oct. 27, 2022

(30) Foreign Application Priority Data

Sep. 17, 2019 (AU) ................................ 2019 903447

(51) Int. Cl.
*E06B 9/58* (2006.01)
*E06B 9/42* (2006.01)
*E06B 9/78* (2006.01)

(52) U.S. Cl.
CPC ................ *E06B 9/582* (2013.01); *E06B 9/42* (2013.01); *E06B 2009/583* (2013.01); *E06B 2009/588* (2013.01); *E06B 2009/785* (2013.01)

(58) Field of Classification Search
CPC ...... E06B 9/582; E06B 9/42; E06B 2009/583; E06B 2009/588; E06B 2009/785; E06B 9/72; E06B 2009/587
See application file for complete search history.

(56) References Cited

U.S. PATENT DOCUMENTS

| | | | |
|---|---|---|---|
| 922,151 | A | 7/1907 | Kelsey |
| 3,292,685 | A | 12/1966 | Clark |
| 4,357,978 | A | 11/1982 | Keller et al. |
| 5,535,806 | A | 7/1996 | Kold et al. |
| 2014/0251553 | A1 | 9/2014 | Farntrog |

(Continued)

FOREIGN PATENT DOCUMENTS

| | | |
|---|---|---|
| DE | 694371 | 2/1970 |
| DE | 19935729 | 8/2001 |

(Continued)

*Primary Examiner* — Beth A Stephan
(74) *Attorney, Agent, or Firm* — Sand, Sebolt & Wernow Co., LPA

(57) ABSTRACT

A blockout blind system includes side tracks fitted with brushes in conjunction with a pelmet fitted with flaps ensure no light can pass around the blind. The flaps and brushes have offset apertures either side of the blind to allow for airflow thus preventing the blind being sucked out or pushed in by open or leaking windows and air conditioning systems. The system also conceals the chain for operating the blind thus eliminating strangulation hazards for children and animals. The design allows the system to be fitted to existing roller blinds.

12 Claims, 8 Drawing Sheets

(56) References Cited

U.S. PATENT DOCUMENTS

| | | | | |
|---|---|---|---|---|
| 2017/0009524 | A1* | 1/2017 | Dwarka | E06B 9/44 |
| 2017/0356239 | A1* | 12/2017 | Ouyang | E06B 9/80 |
| 2018/0044977 | A1* | 2/2018 | Bonnell | E06B 9/582 |
| 2018/0298687 | A1* | 10/2018 | Hall | E04B 2/7453 |
| 2019/0048658 | A1* | 2/2019 | Garcia Hernandez | E06B 9/44 |

FOREIGN PATENT DOCUMENTS

| | | |
|---|---|---|
| EP | 1318267 | 6/2003 |
| FR | 2141645 | 1/1973 |
| FR | 2544788 | 10/1984 |
| GB | 2462928 | 3/2010 |

* cited by examiner

BLOCKOUT BLIND SYSTEM

FIELD OF THE INVENTION

The present invention relates to window blinds, in particular a blockout blind system suitable for use with existing roller blinds.

BACKGROUND TO THE INVENTION

Blockout blinds are used to block all or nearly all light from entering through a window and are often considered a necessity for shift workers. They are also becoming an increasingly popular addition to home cinemas.

To date, effective blockout systems have required removal of existing blinds and replacement with purpose made components. Quite often the existing blinds are in good order and sometimes even brand new. The discarding of existing blinds is an undesirable environmental and cost burden.

In achieving an effective blockout of light, known systems also achieve the undesired result of blocking close to 100% of airflow. This is problematic in air conditioned environments when there is an air leak around the window as the pressure differential between either side of the blinds can cause the blind being pushed or sucked out of its frame. In buildings with evaporative air conditioning systems it is undesirable to have no external ventilation.

Existing roller blinds are usually operated by a chain which hangs down from the top of the blind, presenting a strangulation hazard to children and animals.

The object of this invention is to provide a blockout blind system to alleviate the above problems, or at least provide the public with a useful alternative.

SUMMARY OF THE INVENTION

In a first aspect the invention provides a blockout blind system comprising a roller blind and side tracks, wherein the side tracks comprise a first channel for accepting the blind and wherein the first channel is fitted with first and second brushes to prevent light passing past the blind.

Preferably the first and second brushes comprise apertures, and wherein the apertures of the first brush are vertically displaced with respect to the apertures of the second brush.

Preferably the system includes a pelmet and the pelmet is fitted with a series of flaps to prevent light passing past the blind.

In preference the series of flaps comprise first and second inner flaps which drape over either side of the blind, and the first and second inner flaps comprise apertures which are horizontally displaced with respect to each other.

Preferably the series of flaps further comprises first and second outer flaps, which hang spaced apart from either side of the blind.

The side tracks may further comprise a second channel for accepting a chain of the roller blind. The system may also comprise a handle for manipulating the chain within the second channel, or the system may also comprise a sprocket in the second channel for manipulating the chain, the sprocket being driven by a handle.

Preferably the system further comprises a bottom rail adapted to accept a bottom rail of the roller blind, and the bottom rail includes ends which sit within the first channels of the side tracks.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
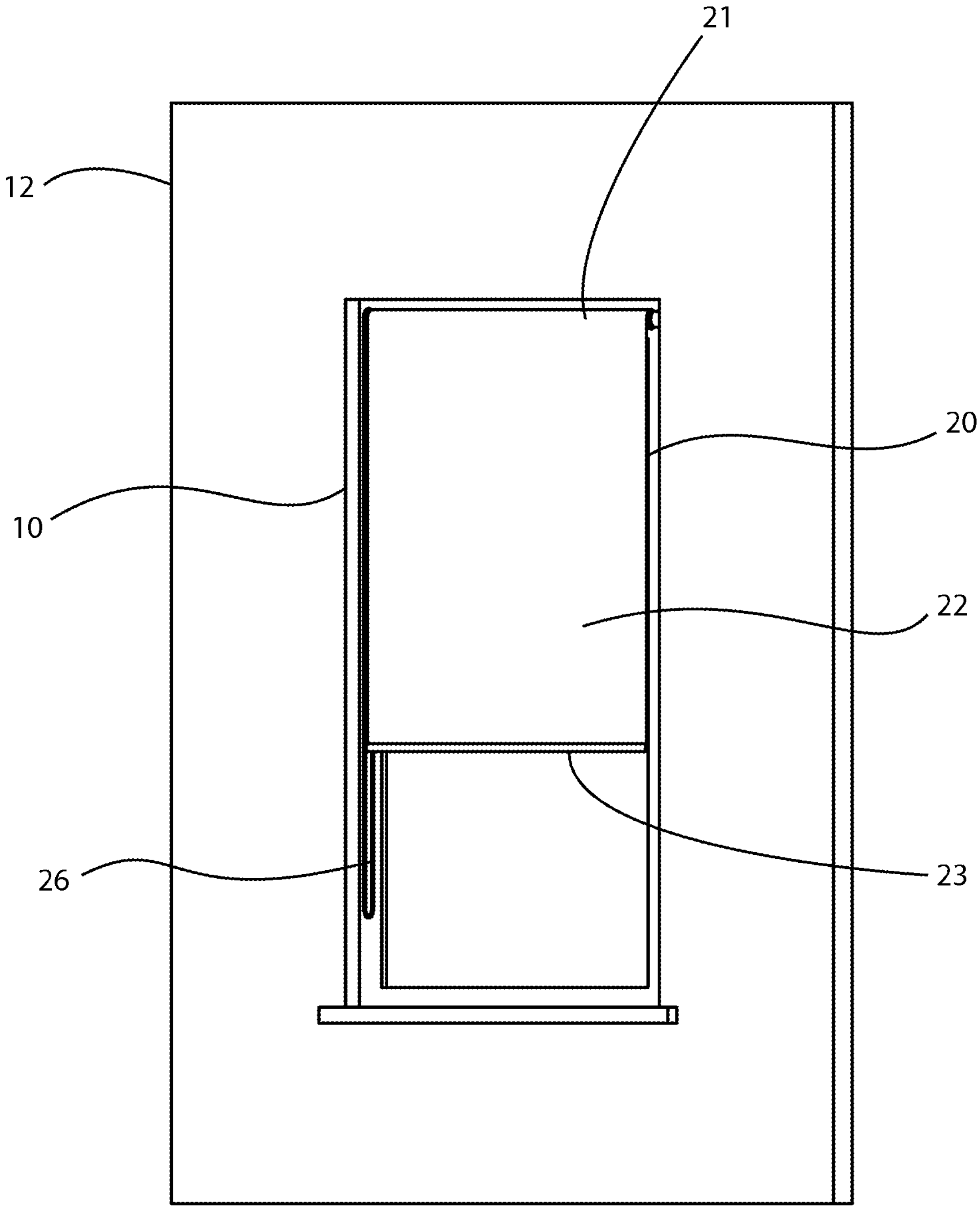
PRIOR ART Figure 1
FIG. 1 shows a window with an existing blind to which the blockout system of the present invention can be fitted.

The drawings include the following integers.

10 window space
12 wall
20 roller blind
21 tube
22 blind
23 bottom bar
26 chain
27 string
28 beads
30 blockout system
40 side track
41 blind channel
42 rear wall
43 middle wall
44 step
45 blind brushes
46 brush holders
50 chain channel
51 front wall
52 side wall
53 side brush
54 brush holder
55 tensioner channel
60 pelmet
61 front wall
62 top wall
63 flap holders
64 top brush
65 brush holder

70 outer flaps
71 air gap
72 sealing flaps
80 cross rail
81 cavity
82 blind slot
83 bottom brush
84 brush holder
85 weighted section
90 handle
91 offset end
92 channels
93 slot
99 angled handle

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a blockout blind system that can be used with conventional roller blinds, making it suitable for both new and retrofit applications. Side tracks fitted with brushes in conjunction with a pelmet fitted with flaps ensure virtually no light can pass around the blind. The flaps and brushes have offset apertures either side of the blind to allow for airflow thus preventing the blind being sucked out or pushed in by open or leaking windows and air conditioning systems. The system also conceals the chain for operating the blind thus eliminating strangulation hazards for children and animals.

FIG. 1 shows a window space 10 in a wall 12 fitted with a roller blind 20 as is well known in the art. The roller blind 20 includes a tube 21 around which a blind 22 is wound. The blind includes a bottom bar 23 to help it hang neatly. The blind is supported by brackets and includes a sprocket (not shown) at the end of the tube driven by chain 26 to lower or raise the blind. The chain 26 comprises a string 27 passing through a series of regularly spaced beads 28 (seen in detail in FIG. 8A). A chain tensioner, typically another sprocket, may be fitted to the bottom of the chain to hold it taut thus allowing either side of the chain to both raise or lower the blind.

Figure 2:
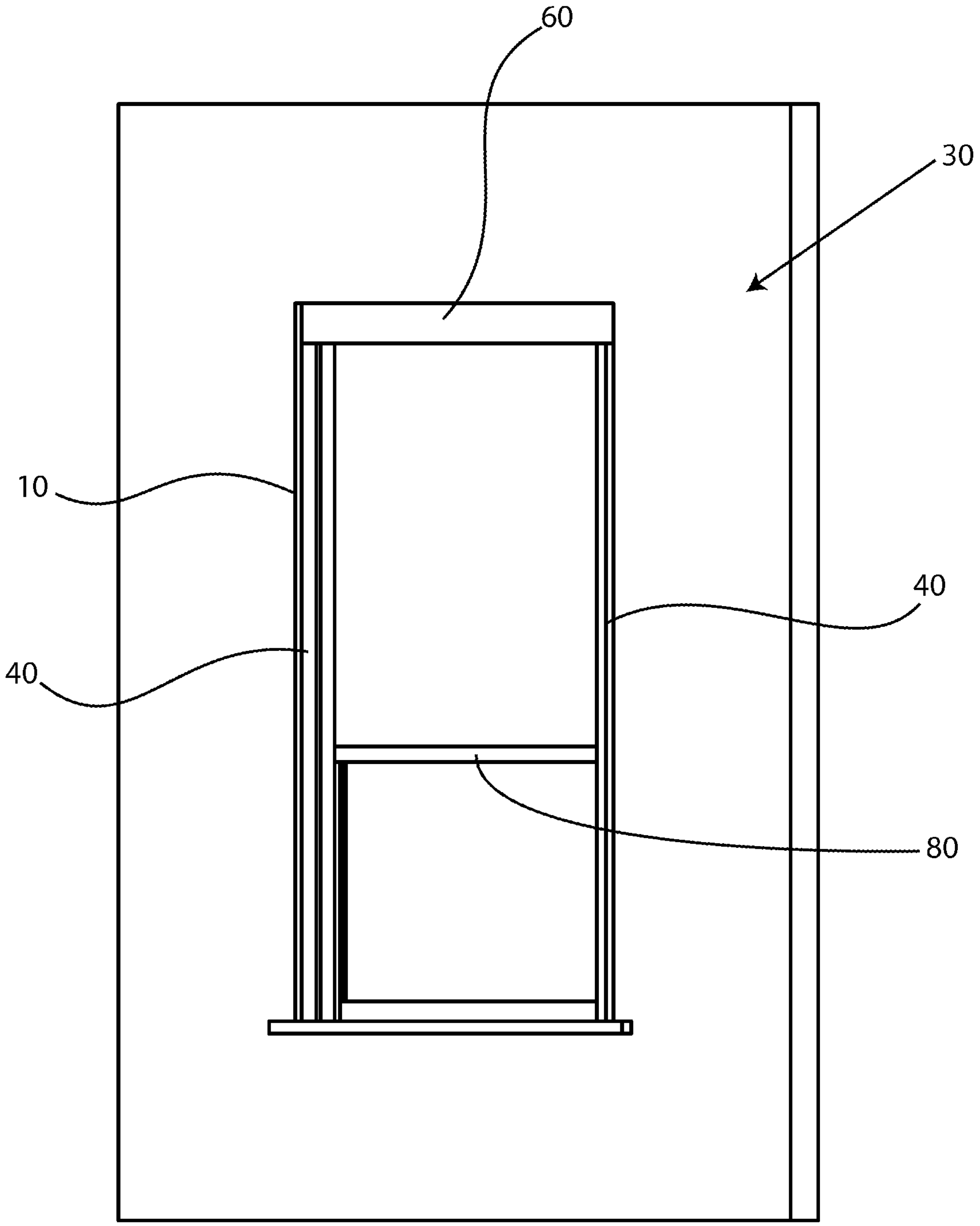
FIG. 2 shows the existing blind with the blockout system of the present invention fitted.

FIG. 2 shows the window space and blind as in FIG. 1, but now fitted with a blockout blind system 30 according to the present invention. The figure serves to identify the context of the various major elements of the system without showing their details. The system comprises side tracks 40 which provide a light seal to the sides of the blind, a pelmet 60 which provides a light seal to the top of the blind, and a cross rail 80 which envelopes the bottom bar of the blind and provides a light seal for the bottom of the blind when fully closed. The side tracks and pelmet include features to allow air flow around the blind whilst blocking light.

Figure 3:
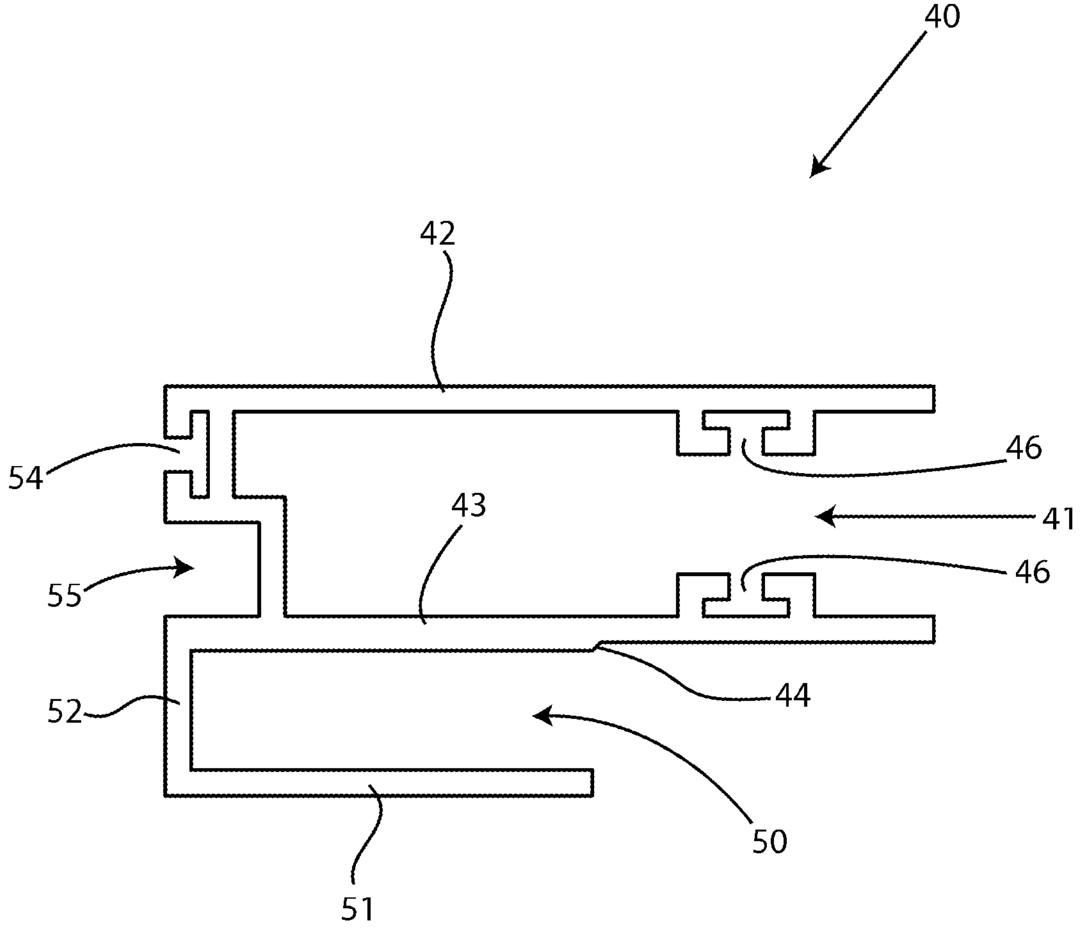
FIG. 3 shows a cross section view of the side track of the system.
Figure 4:
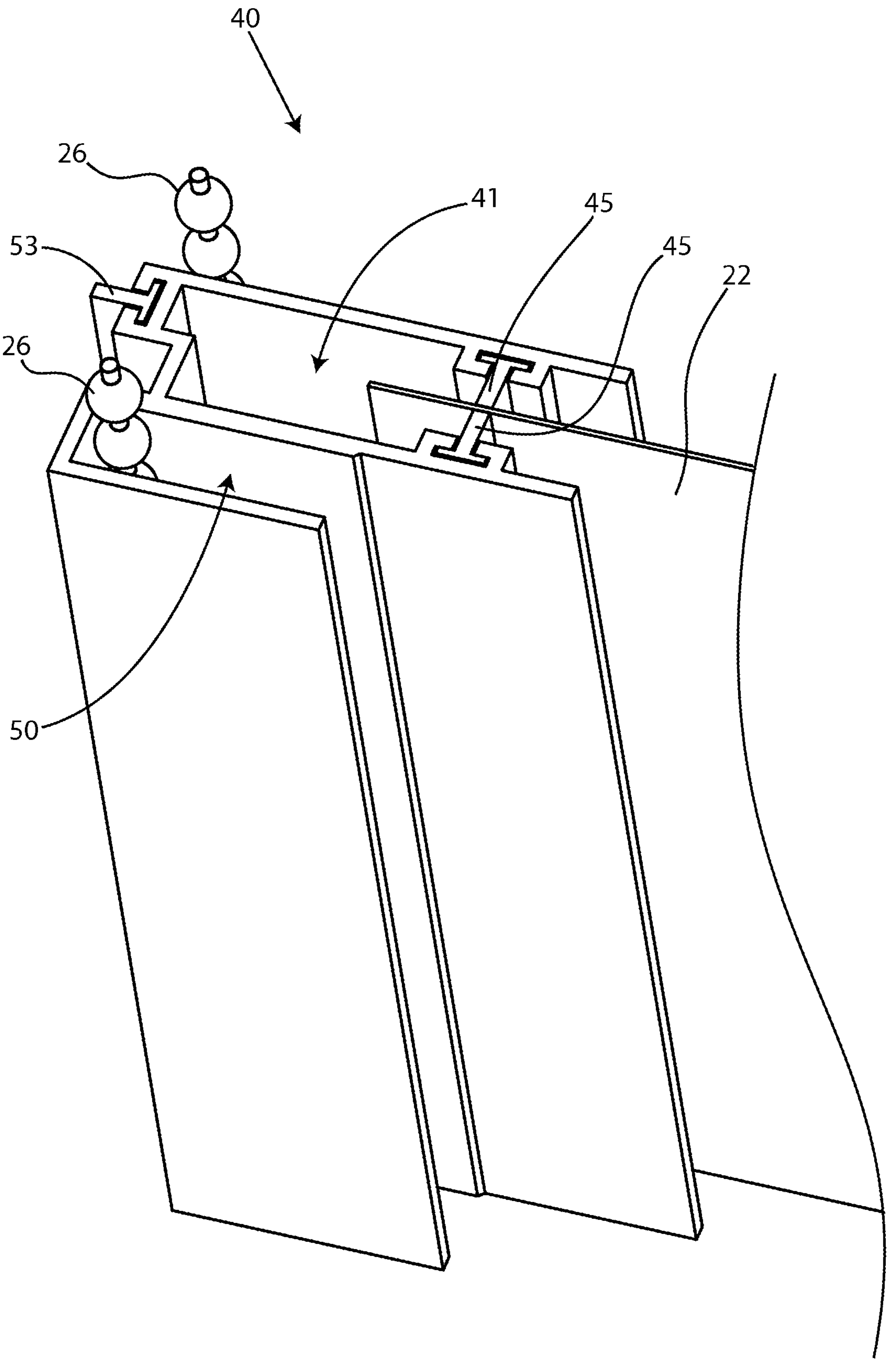
FIG. 4 shows a perspective view of the side track in use with a blind fitted.

A top view of the side track 40 is shown in FIG. 3, whilst details of the side track and how it engages with the blind 22 can be seen in the perspective view of FIG. 4. The side track comprises two main elements, a blind channel 41 for accepting the blind 22 defined by rear wall 42 and middle wall 43, and a chain channel 50 for containing the front of the chain 26 defined by the middle wall 43 and a front wall 51. The rear, middle and front walls all extend from a side wall 52 which sits against the side of the window space 10. A side brush 53 sits within brush holder 54 to seal any potential light gaps. Tensioner channel 55 provides clearance for a chain tensioner (not shown) to be fitted at the lower end of the chain 26. To allow the chain 26 to pass from the chain channel 50 around the tensioner and behind the side track, a small amount of material is removed from the bottom of the side track. The chain channel is approximately 25 mm deep and 6 mm wide to deny finger access to the chain but allow the chain to be operated with a special handle 90 as discussed below with the aid of FIGS. 8A and 8B. The middle wall 43 includes a step 44 so that the handle 90 doesn't rub against and potentially scratch the visible portion of the middle wall. The blind channel 41 includes blind brushes 45 held by brush holders 46 which provide a light seal against the front and rear of the blind 22. The brushes have apertures (not shown) to allow some airflow around the blind. To prevent light also passing around the blind, the apertures of the front and rear brushes are vertically offset from each other.

Figure 5:
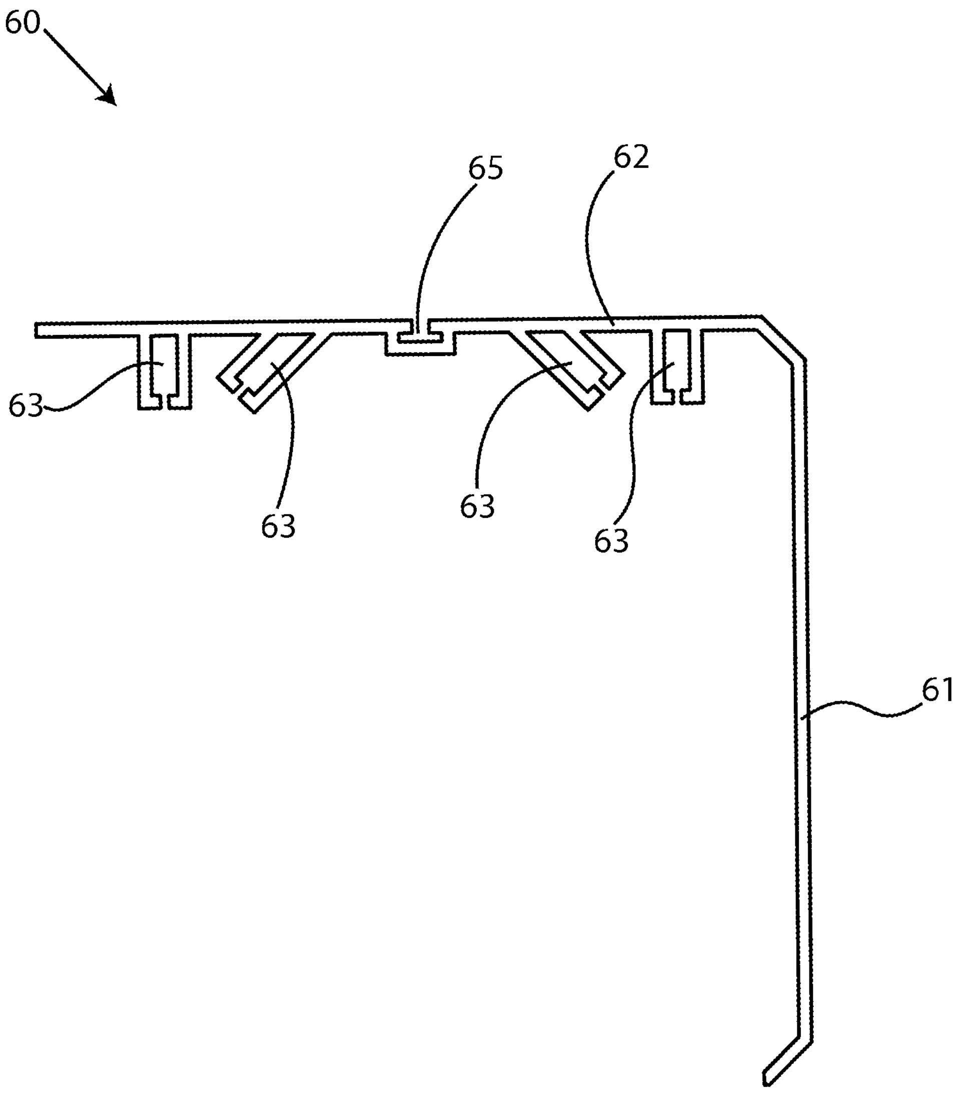
FIG. 5 shows a cross section side view of the pelmet of the system.
Figure 6:
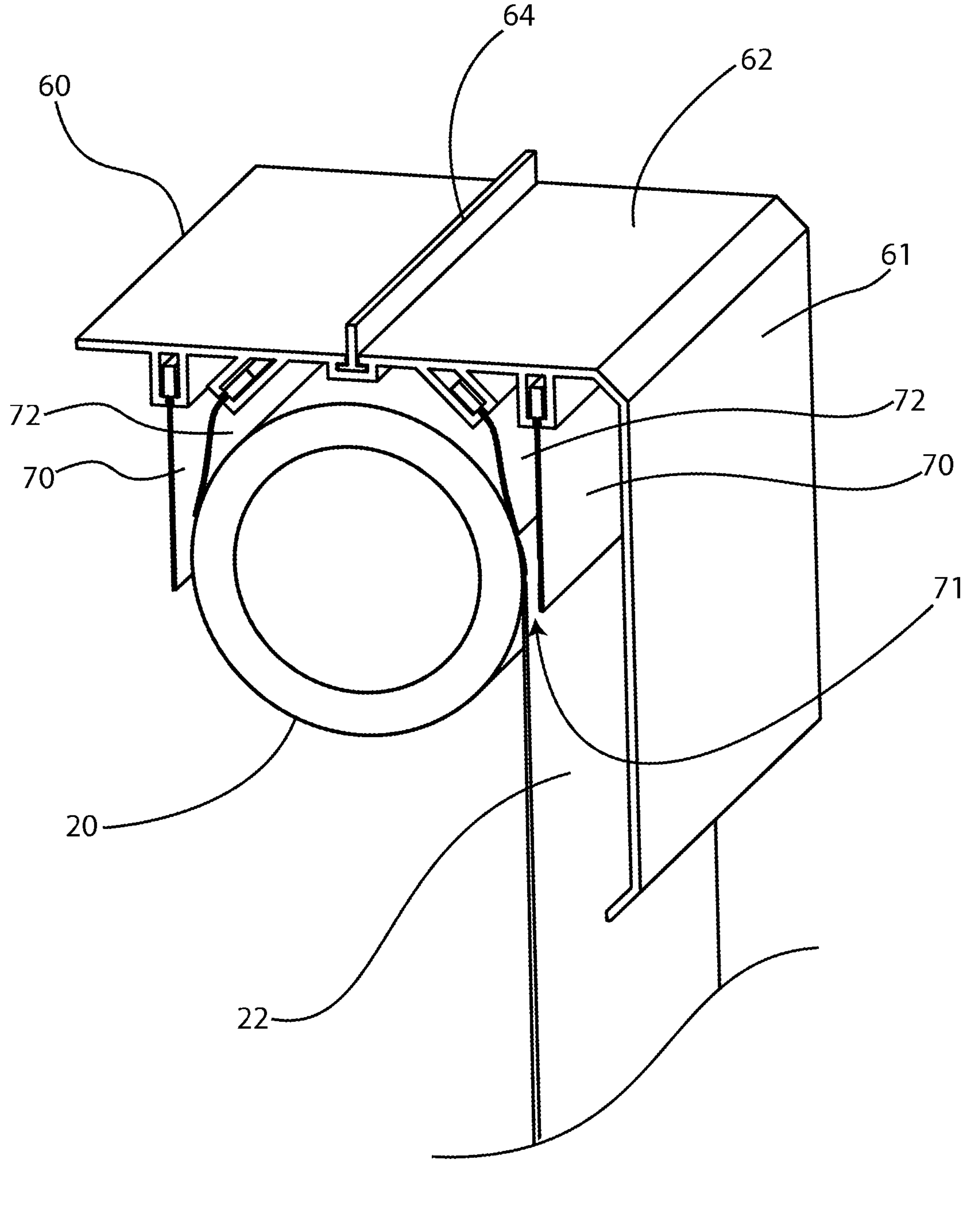
FIG. 6 shows a perspective view of the pelmet fitted with a blind, light blocking flaps, and light blocking brush.

A side view of a pelmet 60 is shown in FIG. 5, whilst FIG. 6 shows a cutaway view of the pelmet with a roller blind 20 fitted detailing how the pelmet provides a light seal at the top of the blind. The pelmet 60 comprises a front wall 61 to help with blocking light and to also hide the inner features of the pelmet, and a top wall 62 from which a series of flaps are suspended from holders 63 to prevent light from passing over the top of the blind. The top wall 62 sits against the top of the window space 10 and includes a top brush 64 sitting within brush holder 65 to seal any potential light gaps. Outer flaps 70 hang vertically either side of the blind leaving an airgap 71. Inner flaps 72 lie against the blind. To allow some airflow over the top of the blind the inner flaps include apertures (not shown). The apertures of the two inner flaps are horizontally offset from each other to prevent light passing through. The front wall of the pelmet together with the four flaps provide an effective light seal whilst still allowing some airflow.

Figure 7A:
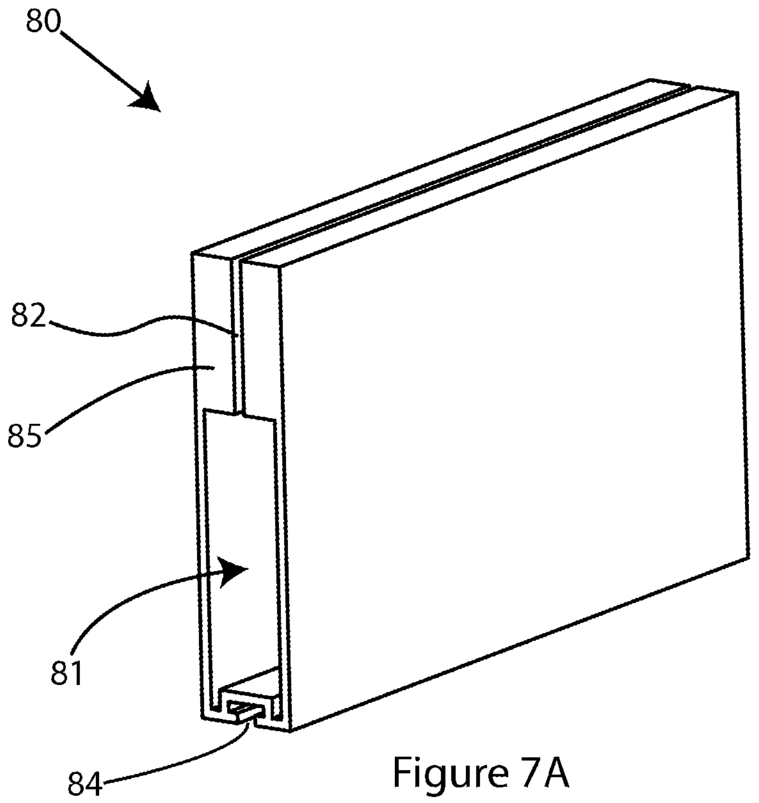
FIG. 7A shows the cross rail of the system.
Figure 7B:
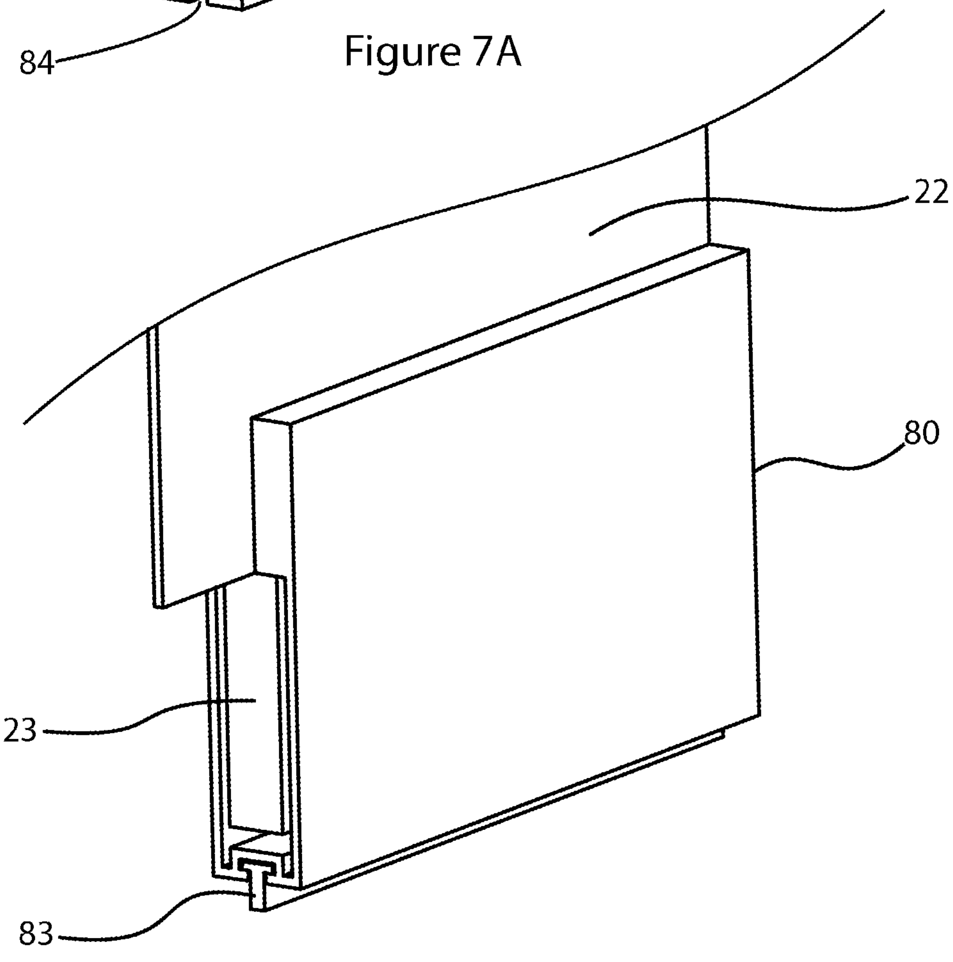
FIG. 7B shows the cross rail fitted with a blind.

To provide a light seal at the bottom of the blind, the bottom bar 23 of the blind 22 is held within the cross rail 80. FIG. 7A shows a cross rail in isolation whilst FIG. 7B shows the blind fitted to the cross rail. The cross rail includes a cavity 81 to accommodate the bottom bar 23 and a narrow slot 82 for the blind to pass through. Brush 83 sitting in holder 84 provides a light seal on the underside of the cross rail when the blind is fully down. The cross rail is approximately 10 mm deep allowing its sides to sit within the correspondingly sized blind channels 41 of the side tracks 40. To help the blind move downwards smoothly the cross rail includes a weighted section 85. The bottom bar 23 is trimmed at its end so that when the cross rail sits within the blind channel 41, the blind 22 can extend through the brushes 45 fitted to the blind channel (as per FIG. 4). End caps (not shown) are fitted to the blind bar to prevent scratching of, and allow smooth movement in, the blind channel.

Figure 8A:
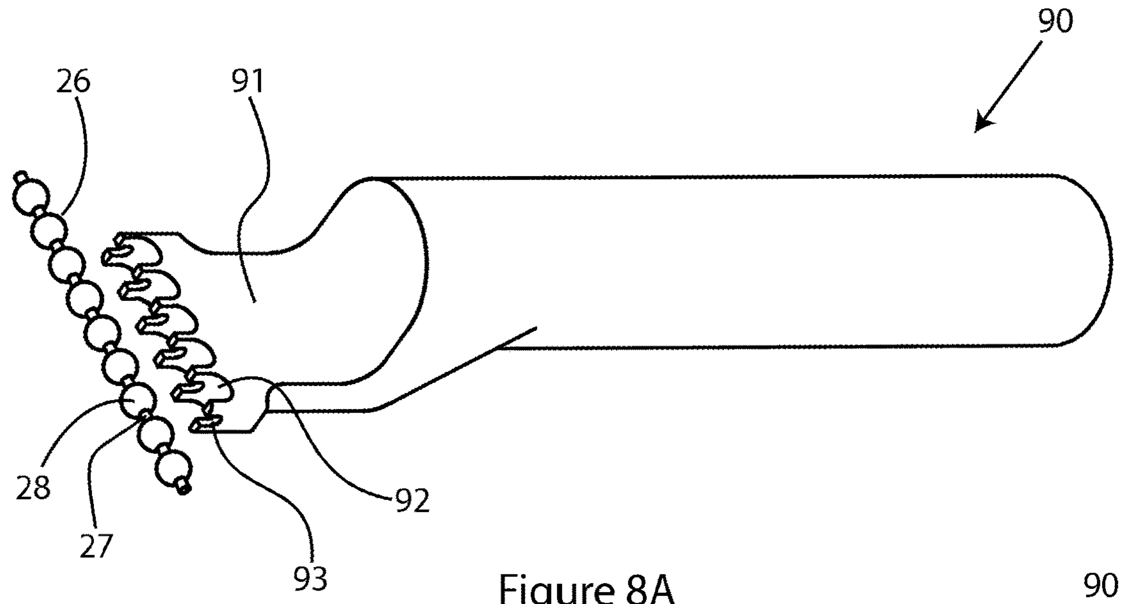
FIG. 8A shows a specialised handle for engaging the chain of the blind.
Figure 8B:
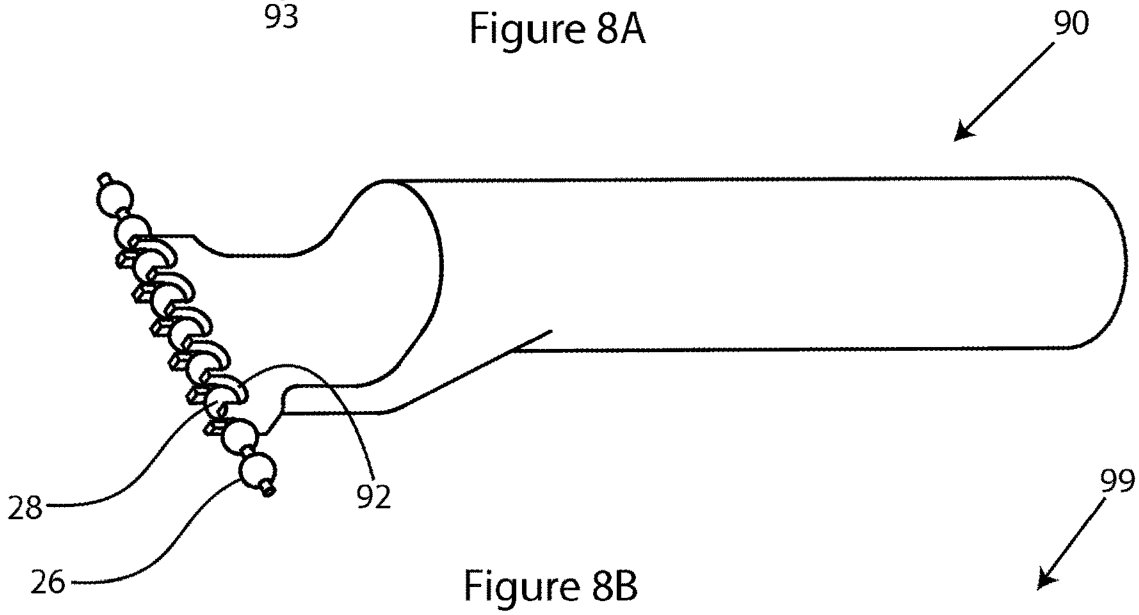
FIG. 8B shows the handle engaged with the chain.

To access the chain 26 in the chain channel 50 a handle 90 as shown in FIGS. 8A and 8B is used. The handle includes an offset end section 91 with a series of channels 92 shaped and spaced to engage with the beads 28 of the chain. The offset provides clearance for fingers between the handle and the blind. Slot 93 accepts the string 27 between the beads thereby allowing the beads to sit completely within the end of the handle. This allows the end of the handle to sit against the inside of the side wall 52 thus eliminating any drag of the beads against the side wall as the handle is moved. Moving the handle up and down will correspondingly move the chain and thus extend or retract the blind as desired. An alternative implementation of the handle is shown as 99 in FIG. 9 in which the end section is at an angle to the main body of the handle to keep the main body clear of the blind and provide finger room.

Figure 9:
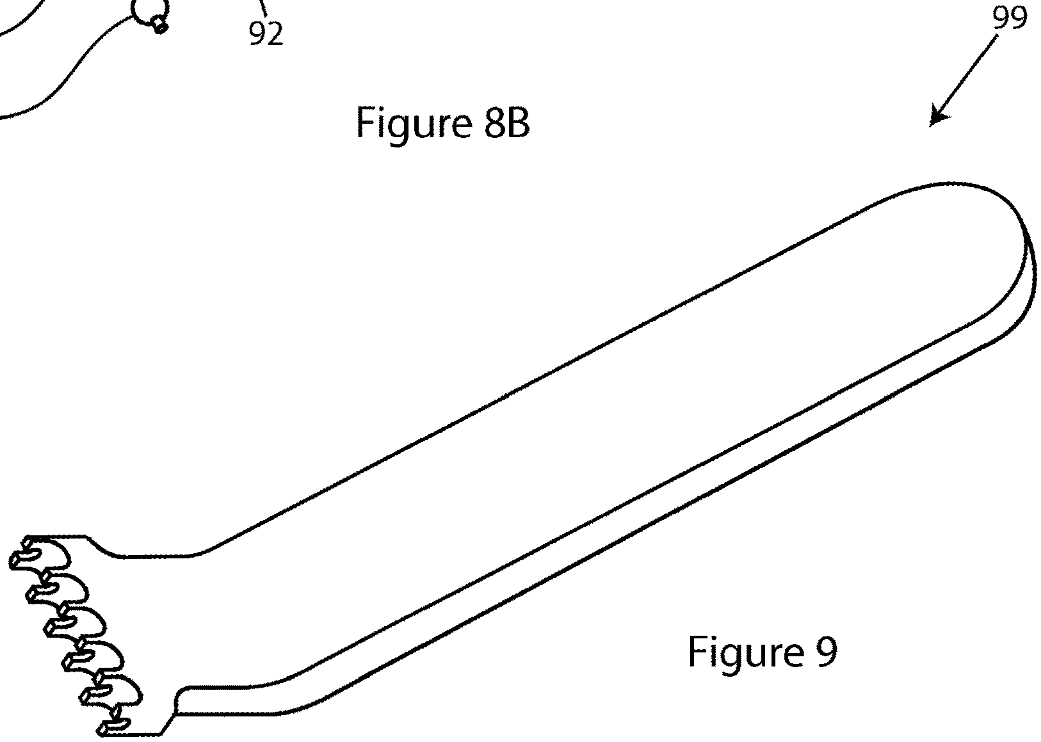
FIG. 9 shows an alternative implementation of the handle.

Instead of using the handles of FIG. 8 or 9 to manipulate the chain, a chain sprocket can be fitted to the chain channel 50 of the side track to engage the chain. Preferably the sprocket is positioned close to the inside of the side wall 52 to trap the chain in order to eliminate the chance of chain slippage. The sprocket is driven by a small handle which may be made removable if desired.

The side track, pelmet and cross rail are preferably made from extruded aluminium powder coated in various colours. The flaps fitted to the pelmet are preferably of a conventional blind material, again in matt black to minimise reflection of light.

The above disclosure has described a blockout blind system that can be used with conventional roller blinds, making it suitable for both new and retrofit applications. Side tracks fitted with brushes in conjunction with a pelmet fitted with flaps ensure no light can pass around the blind. The flaps and brushes have offset apertures either side of the blind to allow for airflow thus preventing the blind being sucked out or pushed in by open or leaking windows and air conditioning systems. The system also conceals the chain for operating the blind thus eliminating choking hazards for children and animals.

The system described has many features that when combined blockout light very effectively, possibly even by 100%. Not all applications require 100% blockout and sometimes people even prefer a small degree of light leakage. In such applications the side tracks alone may achieve the desired result, or the side tracks in combination with a simple pelmet without the additional flaps, or perhaps with a pelmet with 1, 2 or 3 of the flaps.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A blockout blind system comprising:
a roller blind and side tracks;
a chain configured to move the roller blind between an open position and a closed position;
wherein the side tracks defines a first channel open in a first direction;
wherein the roller blind is received within the first channel defined by the side tracks;
wherein the side tracks further defines a second channel open in the first direction; and
wherein the chain is received within the second channel.

2. The blockout blind system as in claim 1, wherein the first channel is fitted with a first brush and a second brush to prevent light passing past the blind.

3. The blockout blind system as in claim 2, wherein the first and second brushes comprise apertures, and wherein the apertures of the first brush are vertically displaced with respect to the apertures of the second brush.

4. The blockout blind system as in claim 1, further comprising a pelmet.

5. The blockout blind system as in claim 1, further comprising a handle, wherein the handle is adapted to fit within the second channel and engage the chain.

6. The blockout blind system as in claim 1, further comprising a sprocket fitted to the second channel, wherein the sprocket is adapted to engage the chain, and wherein the sprocket is fitted with a handle.

7. The blockout blind system as in claim 1, wherein the side tracks have the same length as one another, and wherein the second channel is open in the first direction along the length of the side tracks.

8. A blockout blind system comprising:
a roller blind;
side tracks;
a pelmet;
wherein the sidetracks comprise a first channel for accepting the roller blind;
wherein the first channel is fitted with first and second brushes to prevent light passing past the roller blind;
wherein the pelmet comprises a series of holders; and
wherein a series of flaps are each at least partially receivable within one of the series of holders to prevent light passing past the roller blind.

9. The blockout blind system as in claim 8, wherein the series of flaps comprise first and second inner flaps which drape over either side of the roller blind.

10. The blockout blind system as in claim 9, wherein the first and second inner flaps comprise apertures, and wherein the apertures of the first inner flap are horizontally displaced with respect to the apertures of the second inner flap.

11. The blockout blind system as in claim 10, wherein the series of flaps further comprises first and second outer flaps, and wherein the first and second outer flaps hang spaced apart from either side of the blind.

12. A blockout blind system, comprising:
a roller blind;
sidetracks; and
a sprocket;
wherein the sidetracks further comprise a first channel and a second channel;
wherein the first channel is fitted with first and second brushes to prevent light passing past the roller blind;
wherein the second channel accepts a chain of the roller blind;
wherein the sprocket is adapted to engage the chain; and,
wherein the sprocket is fitted with a handle.

* * * * *